United States Patent
Rutgersson et al.

(10) Patent No.: US 10,919,481 B2
(45) Date of Patent: Feb. 16, 2021

(54) KNEE AIRBAG ARRANGEMENT

(71) Applicant: Volvo Car Corporation, Gothenburg (SE)

(72) Inventors: Sebastian Rutgersson, Gothenburg (SE); Johan Rosenberg, Lerum (SE)

(73) Assignee: Volvo Car Corporation, Gothenburg (SE)

(*) Notice: Subject to any disclaimer, the term of this patent is extended or adjusted under 35 U.S.C. 154(b) by 34 days.

(21) Appl. No.: 16/441,318

(22) Filed: Jun. 14, 2019

(65) Prior Publication Data

US 2020/0017060 A1 Jan. 16, 2020

(30) Foreign Application Priority Data

Jul. 13, 2018 (EP) .................................... 18183462

(51) Int. Cl.

| *B60R 21/206* | (2011.01) |
| *B60R 21/233* | (2006.01) |
| *B60R 21/015* | (2006.01) |
| *B60R 21/231* | (2011.01) |

(52) U.S. Cl.
CPC ...... *B60R 21/233* (2013.01); *B60R 21/01512* (2014.10); *B60R 21/206* (2013.01); *B60R 2021/23107* (2013.01); *B60R 2021/23169* (2013.01); *B60R 2021/23308* (2013.01)

(58) Field of Classification Search
CPC ............... B60R 21/206; B60R 21/233; B60R 2021/23107; B60R 2021/23169; B60R 2021/23308
See application file for complete search history.

(56) References Cited

U.S. PATENT DOCUMENTS

| 6,227,564 | B1 | 5/2001 | Ikegami | |
| 9,061,646 | B2* | 6/2015 | Abele | B60R 21/206 |
| 9,956,937 | B2* | 5/2018 | Jindal | B60R 21/205 |
| 2007/0205590 | A1 | 9/2007 | Klinkenberger et al. | |
| 2011/0175334 | A1* | 7/2011 | Miller | B60R 21/233 |
| | | | | 280/730.2 |
| 2015/0307055 | A1* | 10/2015 | Cheng | B60R 21/203 |
| | | | | 280/728.3 |

(Continued)

FOREIGN PATENT DOCUMENTS

| DE | 102011014650 A1 | 9/2012 |
| WO | 2016085168 A1 | 6/2016 |

OTHER PUBLICATIONS

Dec. 3, 2018 European Search Report issue on International Application No. EP18183462.

*Primary Examiner* — James A English
(74) *Attorney, Agent, or Firm* — Clements Bernard Walker; Christopher L. Bernard (57) ABSTRACT

A knee airbag arrangement for a vehicle. The knee airbag arrangement includes an inflatable airbag. The airbag is adapted to be inflated to a position between an instrument panel of the vehicle and a knee/shin region of a vehicle occupant. A depth ($D_1$, $D_2$) of the airbag in a deployed state is a greatest extent of the airbag perpendicular to the instrument panel in the knee/shin region. The airbag is adapted to form a first deployment mode or a second deployment mode when in a deployed state. The depth of the airbag in the second deployment mode is greater than a depth of the airbag in the first deployment mode.

14 Claims, 4 Drawing Sheets

(56) References Cited

U.S. PATENT DOCUMENTS

| | | | |
|---|---|---|---|
| 2016/0311392 A1* | 10/2016 | Jindal | B60R 21/231 |
| 2017/0015266 A1* | 1/2017 | El-Jawahri | B60R 21/233 |
| 2017/0313276 A1* | 11/2017 | Yoo | B60R 21/239 |
| 2018/0345899 A1* | 12/2018 | Munsee | B60R 21/239 |
| 2018/0361978 A1* | 12/2018 | Belwafa | B60R 21/233 |
| 2020/0017061 A1* | 1/2020 | Rutgersson | B60R 21/237 |

* cited by examiner

Fig. 6

KNEE AIRBAG ARRANGEMENT

CROSS-REFERENCE TO RELATED APPLICATION

The present disclosure claims the benefit of priority of co-pending European Patent Application No. 18183462.3, filed on Jul. 13, 2018, and entitled 'KNEE AIRBAG ARRANGEMENT," the contents of which are incorporated in full by reference herein.

TECHNICAL FIELD

The present invention relates to a knee airbag arrangement for a vehicle. The present invention further relates to a vehicle comprising the knee airbag arrangement. The present invention also relates to a method for deploying an airbag of the knee airbag arrangement.

BACKGROUND

A vehicle may be equipped with a knee airbag for protection of the knee/shin region of the vehicle occupant during a collision. The knee airbag in its inflated position is intended to restrain the knee/shin region of the vehicle occupant and thereby protect the vehicle occupant from colliding with an interior object such as the instrument panel in front of the seat. It is known various knee airbags aiming at providing protection for different sized vehicle occupants and different crash modes.

With the introduction of vehicles with AD capabilities, i.e. autonomous drive capabilities, there is a potential for the occupants to move and adjust the vehicle seat even more freely than is possible today. In particular, a more retracted, as well as reclined position, than allowed today may be desirable, or at least more frequently used, in particular by a driver of the vehicle when the vehicle is driving autonomously.

Hence, the development of AD vehicles poses new challenges to inflatable restraint devices, such as a knee airbag. A vehicle occupant may be seated further away from the instrument panel and potentially also in a more reclined position, when the vehicle is in an autonomous driving mode. Thus, the adjustable range of the vehicle seat in the vehicle may increase further rearwards in the vehicle as compared to non-AD vehicles. In this way, a deployment configuration of an existing/current knee airbag may be insufficient for achieving the desired early interaction between the knee/shin region of a vehicle occupant and a knee airbag in the event of a collision. Meanwhile, it is anticipated that the vehicle will be driven in both manual and autonomous driving mode, thus still requiring a deployment of a knee airbag adapted for vehicle occupants seated for manual driving.

As may be realized from above, there is a desire to improve knee/shin protection for a vehicle occupant during a collision when the vehicle occupant is situated further rearwards in the vehicle, which may occur when a vehicle is in autonomous driving mode, whilst maintaining an appropriate protection for the knee/shin region of a vehicle occupant seated for manual driving of the vehicle.

SUMMARY

The object of the present invention is to overcome or ameliorate at least one of the disadvantages of the prior art, or to provide a useful alternative.

It is desirable to provide a knee airbag arrangement being able to perform the dual task of protecting the knee/shin region of a vehicle occupant when positioned in a manual driving mode and when positioned in an AD mode.

Thus, the present invention relates to a knee airbag arrangement for a vehicle. The knee airbag arrangement comprises an inflatable airbag. The airbag is adapted to be inflated to a position between an instrument panel of the vehicle and a knee/shin region of a vehicle occupant. The airbag is adapted to form a first deployment mode or a second deployment mode when in a deployed state. The depth of the airbag in the second deployment mode is greater than a depth of the airbag in the first deployment mode. A depth of the airbag in a deployed state is a greatest extent of the airbag perpendicular to the instrument panel in said knee/shin region.

A knee airbag arrangement as recited above implies a knee airbag arrangement which has a dual-mode function. This, for instance, has the advantageous effect that with the same set-up, i.e. a single airbag housing, inflator and airbag, two different deployed configurations of the airbag may be achieved, thus rendering a protective effect in two different modes, preferably a manual driving mode and an AD mode, as will be further explained below.

The knee airbag arrangement may comprise selection means for selecting the first and/or second deployment mode, e.g. in the form of tear seam(s).

The purpose of a knee airbag arrangement is to protect the knee/shin region of a seated occupant from harmful interaction with the instrument panel of the vehicle, by providing an initial primary impact surface for the knee/shin region of the vehicle occupant during a collision. To this end, the greater depth of the airbag, as described herein, in the second deployment mode implies the advantageous effect of a knee airbag that may provide an early interaction between the knee/shin region of a vehicle occupant seated further to the rear in the vehicle along the longitudinal direction, and the airbag.

The depth of the airbag in the first and second deployment modes, respectively, may correspond to a minimum and a maximum depth of the airbag, respectively. It is envisaged that the airbag may be adapted to form any number of deployment modes for which respective deployment mode, the depth of the airbag falls within a range from the minimum depth to the maximum depth. It may even be envisaged that the number of deployment modes between said first and second deployment mode may be infinite.

As will be further explained below, the difference in depth of the airbag, as described above for the first and second deployment mode, may be achieved by selective deployment of an airbag member, and by selectively blocking deployment of an airbag member.

Directions as used herein relate to known extensions and directions of a vehicle. As such, the vehicle extends in a longitudinal direction, a lateral direction and a height direction, which directions are perpendicular to each other and assuming the vehicle is standing on flat ground. The longitudinal direction is the normal driving direction of the vehicle. The lateral direction is a cross direction of the vehicle.

The first or second deployment mode of an airbag as described herein may thus be selected depending on the seating position of the vehicle occupant, corresponding to a manual driving position or an AD position, respectively, of the seated vehicle occupant.

In this context, a manual driving position may correspond to a position of the vehicle occupant. As such, a manual driving position may comprise a range of seating positions, corresponding to a manual adjustment range of the vehicle seat, within which the vehicle occupant freely makes comfort adjustments based on personal criteria and/or size. However, within this adjustment range, the vehicle occupant is positioned such that the seated vehicle occupant is able to operate a steering wheel and pedals in order to actively drive the vehicle.

An AD position may correspond to a seating position of the vehicle occupant during autonomous drive of the vehicle. In this context, the vehicle seat may be further adjusted to the rear of the vehicle as seen along a longitudinal direction, i.e. extending further rearwards than the adjustment range of the manual driving position. Thus, this reflects a situation in which the seated vehicle occupant is not actively driving the vehicle, and subsequently the steering wheel and/or pedals do not have to be within operative reach of the seated vehicle occupant. The vehicle seat may further be adjusted to a reclined position for allowing the vehicle occupant to relax or rest while the vehicle is in autonomous drive.

The depth of the airbag is a greatest extent of the deployed airbag perpendicular to the instrument panel in the knee/shin region. Thus, the depth of the airbag extends rearwards and downwards along the longitudinal and height directions of the vehicle. To this end, an increase in depth implies that the knee airbag fills a larger space, and subsequently extends further rearwards in the vehicle as seen in a longitudinal direction of the vehicle. This may be seen as reflecting a situation in which a vehicle occupant has adjusted his/hers seating position further to the rear in the vehicle, resulting in an larger space between the instrument panel and the knee/shin region of the seated vehicle occupant.

Thus a knee airbag arrangement as recited above, having a second deployment mode which extends further rearwards in the vehicle, implies an airbag that enables an early interaction between the knee/shin region of a vehicle occupant and the vehicle under circumstances when the seated vehicle occupant is positioned further rearwards in the vehicle than during manual driving, such as, as described above, when the vehicle is in AD.

In the second deployment mode, the depth of the knee airbag may be at least 10 cm, preferably at least 15 cm, more preferably at least 20 cm, most preferably at least 25 cm greater than the depth in the first deployment mode. In this way, an advantageous early interaction between a vehicle occupant seated further rearwards in the vehicle and the airbag may be achieved.

The knee airbag may comprise an inflatable first airbag member, and a second airbag member, being selectively inflatable. In this case, in the first deployment mode of the knee airbag, the first airbag member is deployed and the second airbag member is undeployed. In the second deployment mode, the first airbag member and the second airbag member are deployed.

A configuration of the knee airbag in this way implies that the second airbag member is adapted to be deployed such that it provides or contributes to the greater depth of the airbag in the second deployment mode. As such, a deployment of the second airbag member implies that the knee airbag arrangement will assume a deployed state that will have a greater depth than if the second airbag member is not inflated. Thus, the second airbag member may be seen as an additional bag member, an extra volume, being selectively inflated, to achieve a (second) deployment mode extending further rearwards in the vehicle. As previously mentioned, this implies a positive effect in that the same set-up may be used in two different deployment modes, with a single inflator that inflates only the first airbag member in the first deployment mode or the first and second airbag member in the second deployment mode.

To this end, it is envisaged that the first airbag member may comprise of or constitute an airbag member which have been designed and tuned to provide a protective effect for the knee/shin region of a vehicle occupant seated in a position within a manual driving adjustment range of the vehicle seat. The second airbag member, being selectively inflatable depending on deployment mode, may be seen as an additional airbag member, being selectively inflatable, intended to provide the knee airbag arrangement with a greater depth of the airbag in the second deployment mode.

It is envisaged that the first airbag member may even correspond to a current or existing configuration of an airbag, as will be further detailed below, whilst the second airbag member may be an additional member, selectively used in combination with the first airbag member to achieve a second deployment mode as defined herein.

The airbag of knee airbag arrangement as described herein preferably relates to a multi-chamber airbag for protection of the knee/shin region of vehicle occupants. In this case, the multi-chamber airbag comprises or consists of a plurality of chambers being in fluid communication with one another. Thus, one or more of the chambers of the airbag are arranged sequentially one after the other, so as to be consecutively filled, from a single inflator. The airbag is in its undeployed state housed in a housing, or module, commonly positioned in the lower part or underside of the instrument panel, above the foot well. Upon activation of the deployment of the airbag, it deploys along the instrument panel, in the space between the instrument panel and the knee/shin region of the vehicle occupant. To this end, in a first deployment mode as described herein, the chambers of the airbag unfold along the instrument panel. The knee airbag will in this way have a main deployment direction extending along the instrument panel. When viewed from the side of the vehicle, the knee airbag would thus be seen as deploying upwards-rearwards in the vehicle. The airbag also has an extension in the transversal direction of the vehicle.

It is envisaged that the first airbag member as described herein may comprise or consist of the plurality of chambers that represent the airbag to be inflated in a first deployment mode, and thus providing the appropriate protective effect for the vehicle occupant seated in a manual driving position. Following this reasoning, the second airbag member, being selectively inflatable, is envisaged to represent an additional chamber selectively deployed in the second deployment mode, such that the greater depth is achieved.

As an alternative, the most distal chamber from the inflation point of the deployed airbag in the first deployment mode may constitute the first airbag member, and the second airbag member, being selectively inflatable, may represent an additional chamber selectively deployed in the second deployment mode.

An airbag as defined herein, may thus comprise a plurality of chambers. A first airbag member as defined herein, may thus comprise one or more chambers of the plurality of chambers comprised in the airbag. A second airbag member as defined herein may comprise one or more of the plurality of chambers of the airbag, although typically a single chamber.

The second airbag member may be inflated using the same inflator as the first inflatable airbag member, and thus being in fluid communication with the first inflatable airbag member.

The second airbag member may be adapted to in a deployed state be situated at least partly between the instrument panel of the vehicle and the first airbag member.

In this way, a deployment of the second airbag implies that the knee airbag arrangement will assume a deployed state that will have a greater depth, since the depth of the knee airbag arrangement is an extent of the airbag perpendicular to the instrument panel. It further implies that when the second airbag chamber is not deployed, the depth of the knee airbag arrangement in a deployed state will be smaller, and allegedly, also the extent of the airbag in a longitudinal direction of the vehicle will be smaller.

As such, a deployment mode in which the second airbag member is not deployed may represent an existing/current knee airbag configuration, and therefore intended to be used for a vehicle occupant seated within a manual driving adjustment range of the vehicle seat, associated with actively driving of the vehicle.

When the second airbag member is deployed, thus extending the airbag arrangement further rearwards in the vehicle in the longitudinal direction, the knee airbag will be in a position which enables an early interaction with the knee/shin region of a vehicle occupant seated further rearwards than the manual driving adjustment range, as would be envisaged, for example, when the vehicle is in AD mode.

The second airbag member may in a deployed state have a deployment direction being at an angle to a deployment direction of the first airbag member. The angle may be in a range from 30° to 150°, preferably 45° to 135°, more preferably 70° to 110°, most preferably 80° to 100°. This, for instance results, in the positive effect of increasing the depth of the deployed knee airbag in said second deployment mode.

The deployment direction of the first airbag member may extend along the instrument panel of the vehicle.

A deployment direction of a knee airbag implies a thought straight line between a most proximal end, and a most distal end of the inflated airbag. Hence, for a multi-chamber airbag as described above a most proximal end being located at the knee airbag housing, at the lower side of or underside of the instrument panel, at the inflator point, and the most distal end being the opposite end to the proximal end of the knee airbag when deployed. In this way, it is envisaged that the first airbag member has a deployment direction extending substantially along the instrument panel. Thus, when used in a vehicle, the first airbag member may be seen as deployed along the instrument panel, whilst the second airbag member may be seen as deployed towards the instrument panel.

Optionally, an external tether, such as a strap or metal wire, may be attached exteriorly between the second airbag member and the first airbag member. This may be used to stabilize and maintain the angled position of the second airbag member in relation to the first airbag member.

As an alternative configuration, the second airbag member may be adapted to in a deployed state be situated at least partly between the first airbag member and the knee/shin region of the vehicle occupant. The second airbag member may in this way form at least a portion of the initial impact surface for the knee/shin region of the vehicle occupant. In this case, the second airbag member is located at the rear side of the first airbag member, facing rearwards in the vehicle as seen along the longitudinal direction. As previously described, a deployment of the second airbag member implies that the knee airbag arrangement will assume a deployed state that will have a greater depth.

Also for such an arrangement, the second airbag member may in the deployed state have a deployment direction being at an angle to a deployment direction of the first airbag member. The angle may be in a range from 30° to 150°, preferably 45° to 135°, more preferably 70° to 110°, most preferably 80° to 100°. This, for instance, results in the positive effect of increasing the depth of the deployed knee airbag in said second deployment mode.

The second airbag member may be attached to the first airbag member. This for instance results in an advantageous configuration in which the second airbag member is attached to the first airbag member for example by stitching, or by being manufactured as a portion of the same fabric making up the first airbag member. The first and second airbag members will thus form a single piece of fabric, the airbag, which is stored as a single unit the airbag housing, when undeployed.

The second airbag member may be adapted to be inflated via the first airbag member. In this case, the second airbag member is connectable to the first airbag member via a fluid communication means. When selecting the second deployment mode, the fluid communication means is activated to thus open a fluid communication from the first to the second airbag member. Consequently, when selecting the first deployment mode the fluid communication means remains closed, not allowing any fluid communication between the respective members. This implies that the first airbag member is inflated prior to an optional inflation of the second airbag member. This for instance results in an advantageous configuration of the knee airbag arrangement, since a single inflator, such as a gas generator, may be used for inflating the first airbag member and optionally also the second airbag member.

As implied from the above description, the second airbag member may have a significantly smaller volume than the first airbag member. Thus, the second airbag member may form an extra volume which optionally may be inflated, if activated, and in this way directs the location of the first airbag member further to the rear in the vehicle.

The inflatable volume of the second airbag member may be in a range from 5% to 40% of an inflatable volume of the first airbag member, preferably in a range from 10% to 25%, most preferably in a range from 10% to 20%. This implies that the second airbag member may constitute a reasonably small portion of the overall volume which enables the same inflator to be used in both deployment modes whilst maintaining the desired protective effect in both deployment modes.

The airbag may comprise an inflatable common airbag member, a first alternative airbag member being selectively inflatable, and a second alternative airbag member being selectively inflatable. In this case, in the first deployment mode of the knee airbag, the common airbag member and the first alternative airbag member is deployed. In the second deployment mode of the knee airbag arrangement, the common airbag member and the second alternative airbag member is deployed. As such, the second alternative airbag member may be seen as providing the greater depth. This for instance may result in that the two deployment modes make up the same volume to be inflated, which is advantageous using a single, common inflator for both deployment modes.

In view of a multi-chamber airbag comprising a plurality of chambers, as previously described, it is readily understood that the first and second alternative airbag members may correspond to one or more chambers of the airbag.

In this way, the first and second alternative airbag members may be attached to the common airbag member such that they form a respective end member of the deployed airbag, hence the most distal to the inflation point. The first and second alternative airbag may form two alternative end members of the airbag. Thus, either the first or the second alternative airbag member is deployed, via the common airbag member. In other words, the common airbag member is inflated prior to that the first alternative or second alternative airbag is inflated.

It is envisaged that the first and second alternative airbags in this case are attached at different positions of the common airbag member. The first alternative airbag member, being selectively deployed in the first deployment mode may be attached to the common airbag member such that the deployment direction is substantially aligned with the deployment direction of the common airbag member, which would be seen as along the instrument panel. The second alternative member, being selectively deployed in the second deployment mode, may be attached to the common airbag member such that the deployment direction is at an angle to, preferably substantially perpendicular to, the deployment direction of the common airbag member, such that the second alternative airbag is at least partly situated between the instrument panel and knee/shin region of the vehicle occupant or at least partly situated between the common airbag member and the knee/shin region of the vehicle occupant.

This for instance results in a similar configuration of the knee airbag in the second deployment mode as previously described, however, with the difference of maintaining substantially the same volume to be inflated by the inflator in the different deployment modes. Hence, the second alternative airbag member is adapted to provide the greater depth of the knee airbag in the second deployment mode.

The first airbag member, previously described, may be seen to correspond to the common airbag as described above. The second airbag member, previously described, may in this case be seen as to correspond to the second alternative airbag as described above.

For an embodiment as described above, the common airbag member may comprise a plurality of chambers, connected sequentially one after another, thereby forming a portion of a multi-chamber airbag. The first and second alternative airbag members may constitute first and second alternative chambers, forming alternative end chambers of the knee airbag. Thus, the first or second alternative airbag member may form the end chamber of the knee airbag, and being inflated via the common airbag member.

Optionally, the airbag may comprise a top airbag member, not comprised in the common airbag member. The top airbag member constitutes an end airbag member most distal from the inflation point. In this case, the first and second alternative airbag members may form a respective branch in a line of sequentially connected chambers of the airbag, thus forming two alternative ways for the gas to expand. The top airbag member is inflated via the first or the second alternative airbag member.

This is an advantageous configuration of the knee airbag since it provides a plurality of ways of enabling a dual-mode function as recited above.

The different positions of the first and second alternative airbag members inherently given by the branching, e.g. the alternative airbag members represent two alternative ways for the gas to expand, may provide the difference in depth of the deployed knee airbag. As an alternative, or complement, the first and second alternative airbag members may be given different shapes and/or volumes providing a difference in depth of the deployed knee airbag between the first and second deployment modes.

Hence, the first alternative airbag member may be positioned and shaped as to provide an airbag which in the deployed state is similar to, or corresponds to, an existing/current knee airbag configuration, i.e. for vehicle occupants seated for manual driving. The second alternative airbag member may be of different shape and/or volume than the first alternative airbag member, thus providing the greater depth of the said knee airbag in the second deployment mode.

By way of example, the first alternative airbag member may be shaped and sized similar to the plurality of chambers of the common airbag member and top airbag member, between which two the first alternative airbag member extends. In this way, a deployment direction of the first alternative airbag member may be in line with a deployment direction of the common airbag member and the top airbag member. The second alternative airbag member may have a curved shape, such as a circle segment, e.g. a semi-circle, an arched shape or a folded shape, extending between the common airbag member and top airbag member. Further, the second alternative airbag member may be attached to a rear side of the common airbag member and top airbag member respectively, as seen along the longitudinal direction. Hence, the second alternative airbag may be situated towards to knee/shin region of the vehicle occupant, the curved shape of the second alternative airbag member thereby constituting at least a portion of an initial impact surface of the airbag for the knee/shin region of the vehicle occupant. This position of the attachments of the second alternative airbag member results in a significantly different deployment direction of the second alternative airbag member as compared to the deployment direction of the common and the first alternative airbag members. The first alternative airbag member, although not being deployed in the second deployment mode, but still extending between the common airbag member and the top airbag member, may provide additional stability to maintain the location of the deployed airbag. The curved shape of the second alternative airbag member may at least partially be due to the length of the second alternative airbag member being greater than the length of the first alternative airbag member, thus the first alternative airbag member restricts the extension of the airbag.

A knee airbag arrangement as described herein may comprise selection means for selecting the first deployment mode and/or the second deployment mode, e.g. a tear seam. The selection means may be adapted for selectable inflation of the second airbag member or adapted for selectable inflation of the first alternative airbag member or the second alternative airbag member.

This has the positive effect of enabling selective deployment of a selectively inflatable airbag member as recited above.

The selection means may comprise or consist of a tear seam. This is advantageous since it enables an easy and simple way of selecting a selectable airbag member to be inflated.

The tear seam forms the connection between the first and the second airbag members for example, or between the first and second alternative airbag members and the common airbag member and/or the top airbag member, respectively. In other words, the position of the assumed connection between a selectively inflatable airbag member and an airbag member through which it is intended to be inflated, may initially be closed or formed by a tear seam.

The tear seam may further be adapted to be opened, i.e. torn, by an activation means. By opening the tear seam, a fluid communication between the two airbag members is possible thus enabling gas to flow in a direction from the inflation point into the selected airbag member. Hence, the selective deployment of an airbag member is achieved by opening the tear seam between the selectable airbag member and the airbag member through which the selectable airbag member is intended to be inflated. The selectable airbag member is preferably also attached, for example by stitching, to the airbag member through which the selectable airbag member is intended to be inflated. The selectable airbag member may also form a portion of the airbag fabric of the airbag, thus being formed together with the airbag as one piece of airbag fabric. Thereby, a selectable airbag member is attached to the knee airbag independent of whether or not it is selected to be inflated. If a selectively inflatable airbag member is not inflated it will follow the knee airbag during deployment as an extra layer of airbag fabric.

The activation means for activating the selection means may comprise or consist of a pyrotechnical release, such as an exploding fastener. Thus, the tear seam may be connected to a pyrotechnical release, in a manner known to the skilled person. By way of example, the pyrotechnical release may in turn be wired to a control unit. Upon receiving an electrical signal from the control unit, indicating a selection has been made to open a tear seam, the pyrotechnical release is activated and thus opens the tear seam, and thereby a fluid communication between the airbag members is opened.

In an undeployed state of the airbag, the connection between a selectively inflatable airbag member and the airbag member through which it is intended to be inflated, if selected, is closed. Upon activation of the knee airbag arrangement, a selection is carried out whether or not a selectively inflatable airbag member should be selectively deployed, or which selectively inflatable alternative airbag member to deploy. Based on the selection, activation means are activated prior to, or together with, deployment of the airbag. The activation means may also be activated during deployment of the airbag.

As an alternative, the selection means, such as the tear seam, may be pressure controlled such that the selective deployment of the second airbag member occurs as long as the pressure level during deployment of the airbag stays below a pre-determinable threshold. As such, the airbag may be adapted to be deployed in the second deployment mode. The selection of a first deployment mode occurs after deployment of the airbag, and depends on whether a pressure build-up occurs during deployment of the knee airbag, strong enough to prevent the second airbag member to be deployed. This may be caused by an interaction between the knee/shin region of a seated vehicle occupant and the deploying knee airbag to the extent that the knee airbag is pressed against the instrument panel prior to the second airbag member being able to inflate.

Thus, the inflation of the second airbag member is blocked or prevented by the pressure build-up. This would then represent a case where the vehicle occupant is seated in a manual driving position and thus being gained by the first deployment mode, without the deployment of the second airbag member. In this way, the selection of deployment mode is also made based on the position of the seated vehicle occupant, the selection based on the position is achieved, not by detection prior to deployment of the knee airbag but by how the knee/shin region of a vehicle occupant interacts with the knee airbag, which inherently indirectly gives the vehicle occupants position.

The present invention also relates to a vehicle comprising an instrument panel and a knee airbag arrangement as described herein, which comprises an inflatable airbag being adapted to be inflated to a position between said instrument panel of said vehicle and a knee/shin region of a vehicle occupant.

The vehicle may be an AD vehicle, i.e. an autonomous drive vehicle.

The vehicle may comprise at least one sensor for detecting a position of a seated vehicle occupant. The output of the sensor may be used to select the first or second deployment mode. The output of the sensor may be used as a basis to select the first deployment mode or the second deployment mode.

As previously described the position of the vehicle occupant may refer to if the vehicle occupant is seated in within a manual driving adjustment range, or, if the vehicle occupant is seated further to the rear than the manual driving adjustment range, as envisaged during AD. The position of the vehicle occupant may be detected using any kinds of detection means such as camera(s) and/or other types of sensors, such as radar, LIDAR, and seat location sensors. Independently of the detection means, it is the distance between the instrument panel and the knee/shin region of the seated vehicle occupant that is of relevance in selecting deployment mode. Noticeably, detecting the position of the seated vehicle occupant may directly or indirectly provide the distance described above.

The present invention also relates to a method of inflating a knee airbag of a knee airbag arrangement as described herein. The method comprises detecting a position of a seated vehicle occupant, based on the detected position, selecting the first deployment mode or the second deployment mode of the knee airbag, and based on the selection, deploying the airbag according to the first deployment mode or the second deployment mode.

A method as recited above implies the positive effect of a dual-functioning knee airbag arrangement. Depending on the seated position of the vehicle occupant a first or second deployment mode is selected.

The method may comprise, in case the knee airbag arrangement comprises selection means, selecting the first deployment mode or the second deployment mode of the airbag by means of the selection means.

BRIEF DESCRIPTION OF THE DRAWINGS

The present invention will hereinafter be further explained by means of non-limiting examples with reference to the appended drawings wherein.

It should be noted that the appended drawings are schematic and that individual components are not necessarily drawn to scale and that the dimensions of some features of the present invention may have been exaggerated for the sake of clarity.

DESCRIPTION OF EMBODIMENTS

The invention will, in the following, be exemplified by embodiments. It should however be realized that the embodiments are included in order to explain principles of the invention and not to limit the scope of the invention, as defined by the appended claims. A feature from one embodiment may be combined with one or more features of any other embodiment.

The present invention and its advantage over the prior art will be further explained with reference to FIGS. 1 to 6. Directions as used herein relate to known extensions and directions of and in a vehicle. As such, the vehicle 2 extends in a longitudinal direction X, a lateral direction and a height direction Z, which directions are perpendicular to each other, see FIG. 1a. The longitudinal direction X is the normal driving direction of the vehicle 2. The lateral direction is a cross direction of the vehicle 2 and thus not illustrated.

Figure 1A:
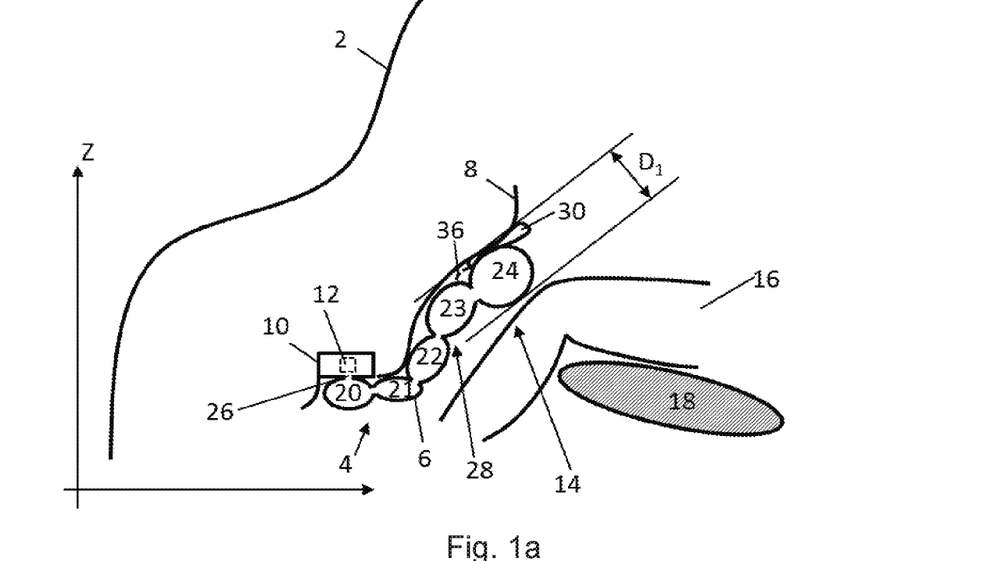
FIGS. 1a and b illustrate two different deployment modes of a knee airbag arrangement in a vehicle according to the present invention.
Figure 1B:
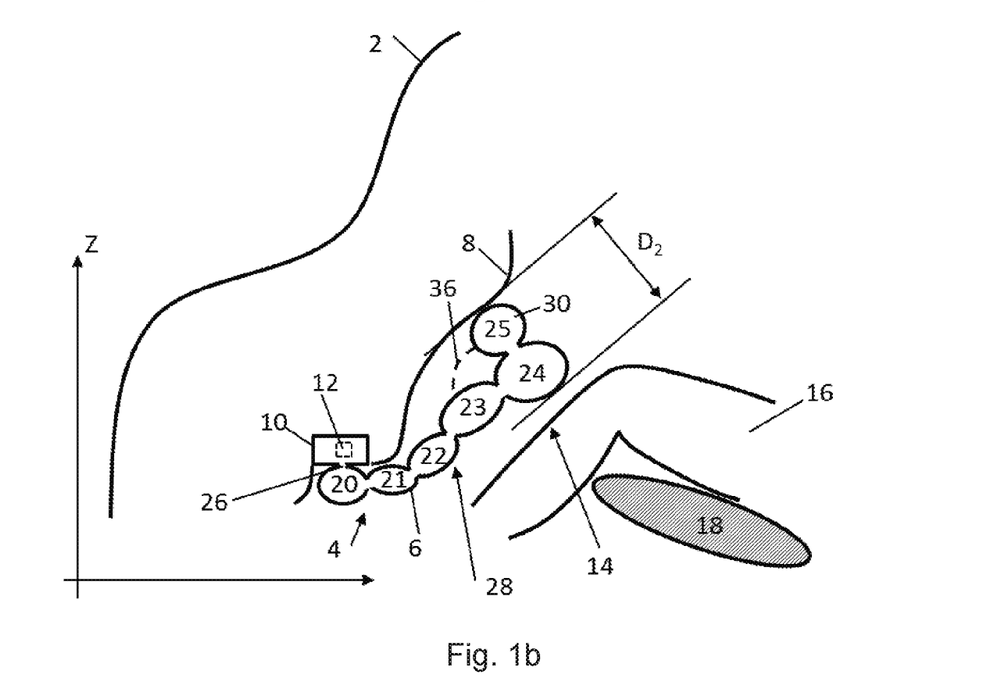

FIGS. 1a and 1b schematically illustrate a vehicle 2 comprising a knee airbag arrangement 4 with an airbag 6 deployed in two different deployment modes according to an embodiment of the present invention. FIG. 1a shows a first deployment mode and FIG. 1b shows a second deployment mode. The vehicle 2 is only schematically depicted. The vehicle may be an AD vehicle. An instrument panel 8 is also schematically depicted. The knee airbag arrangement 4 comprises a housing 10 in which the inflatable airbag 6, when undeployed, and an inflator 12 for inflating and deploying the airbag 6 are stored. The inflator 12 is schematically illustrated in the housing 10. As illustrated, the airbag 6 is adapted to inflate and thereby deploy to a position between the instrument panel 8 and a knee/shin region 14 of a seated vehicle occupant 16. Only a lower extremity of a vehicle occupant 16 seated in a vehicle seat 18 of the vehicle is depicted, the vehicle seat 18 is schematically illustrated. The airbag 6 is operatively connected to the inflator 12 for receiving gas therefrom.

The housing 10 is illustrated in FIGS. 1a and 1b at an underside of the instrument panel 8, but may also be located at a lower portion of the instrument panel 8, depending on the configuration of the instrument panel 8.

The airbag 6 is depicted as a multi-chamber airbag. Thus, a plurality of separate chambers 20, . . . , 25 is formed in the airbag. The chambers 20, . . . , 25 are schematically depicted as ovals in the FIGS. 1, 2 and 4. The chambers 20, . . . , 25 are separated by partitions formed inside the airbag 6. The partitions have through-ports or holes or openings for the gas to flow between the chambers 20, . . . , 25. The airbag 6 inflates through a deployment opening 26 located in the underside of the instrument panel 8, as previously mentioned. The airbag 6 in FIG. 1a is illustrated with five deployed chambers 20, . . . , 24 with an additional deployed chamber 25 in FIG. 1b, the reason for which will be further explained below. However, the airbag 6 may comprise any number of chambers.

As is known to the skilled person, upon detection of a crash condition requiring deployment of the airbag 6, an actuation circuit may directed by a controller to initiate deployment of the airbag 6.

A depth $D_1$, $D_2$ of the airbag 6 in a deployed state is a greatest extent of the airbag 6 perpendicularly to the instrument panel 8 in the knee/shin region 14, see FIGS. 1a and 1b. The depth $D_2$ of the airbag in the second deployment mode is greater than the depth $D_1$ of the airbag 8 in the first deployment mode, see FIGS. 1a and 1b. Thus, the depth $D_1$, $D_2$ of the airbag 6 extends rearwards-downwards, along the longitudinal X and height directions Z. As illustrated, the knee/shin region 14 is further rearwards in FIG. 1b in relation to the instrument panel 8, as compared to in FIG. 1a. Hence, in the second deployment mode, the desired early interaction between the knee/shin region 14 of the vehicle occupant 16 and airbag 6 may be achieved through the greater depth $D_2$ of the airbag 6.

In the second deployment mode, the depth $D_2$ of the airbag 6 may be at least 10 cm, preferably at least 15 cm, more preferably at least 20 cm, most preferably at least 25 cm, greater than the depth $D_1$ in the first deployment mode. In this way an advantageous early interaction between a vehicle occupant 16 seated further rearwards in the vehicle 2 and the airbag 6 may be achieved. By comparison, if instead using an existing/current airbag configuration for deployment in this situation, e.g. when the vehicle occupant is seated further to the rear than the adjustment range of the vehicle seat in manual driving mode, it would be apparent that a significant gap, or space, would remain between the deployed and fully extended airbag and the knee/shin region of the vehicle occupant.

As previously described, the airbag 6 has an additionally deployed chamber 25 in the second deployment mode. As such, it may be seen as that the additional deployed chamber 25 provides the greater depth $D_2$. The airbag 6 comprises an inflatable first airbag member 28, which in FIGS. 1a and 1b is represented by the five lowest chambers 20 to 24. The airbag 6 further comprises a second airbag member 30, being selectively inflatable, which is represented by a top chamber 25, which is deployed in the second deployment mode, see FIG. 1b. Hence, in the first deployment mode of the airbag 6, see FIG. 1a, the first airbag member 28 is deployed and the second airbag member 30 is undeployed. In the second deployment mode, see FIG. 1b, the first and second airbag members 28, 30 are both deployed. As illustrated, an airbag member may comprise one or more chambers of the airbag.

The second airbag member 30 is adapted to in a deployed state be situated at least partly between the instrument panel 8 of said vehicle 2 and the first airbag member 28, as illustrated in FIG. 1b. In this way, a deployment of the second airbag member 30 implies that the knee airbag arrangement 4 will assume a deployed state that will have a greater depth $D_2$ than the depth $D_1$ in the first deployment mode.

Upon activation of the deployment of the airbag 6, it deploys along the instrument panel 8, in the space between the instrument panel 8 and the knee/shin region 14 of the vehicle occupant 16. In the first deployment mode as described herein, the chambers 20, . . . , 24 of the airbag 6, i.e. the first airbag member 28, deploy along the instrument panel 8. The airbag 6 will in this way be seen as having a main deployment direction 32 extending substantially along the instrument panel 8. When viewed from the side of the vehicle, the airbag 6, i.e. first airbag member 28, would thus be seen as unfolded upwards-rearwards in the vehicle 2, see FIG. 2. The airbag 6 also has a deployed extension in the transversal direction of the vehicle, not illustrated.

Figure 2:
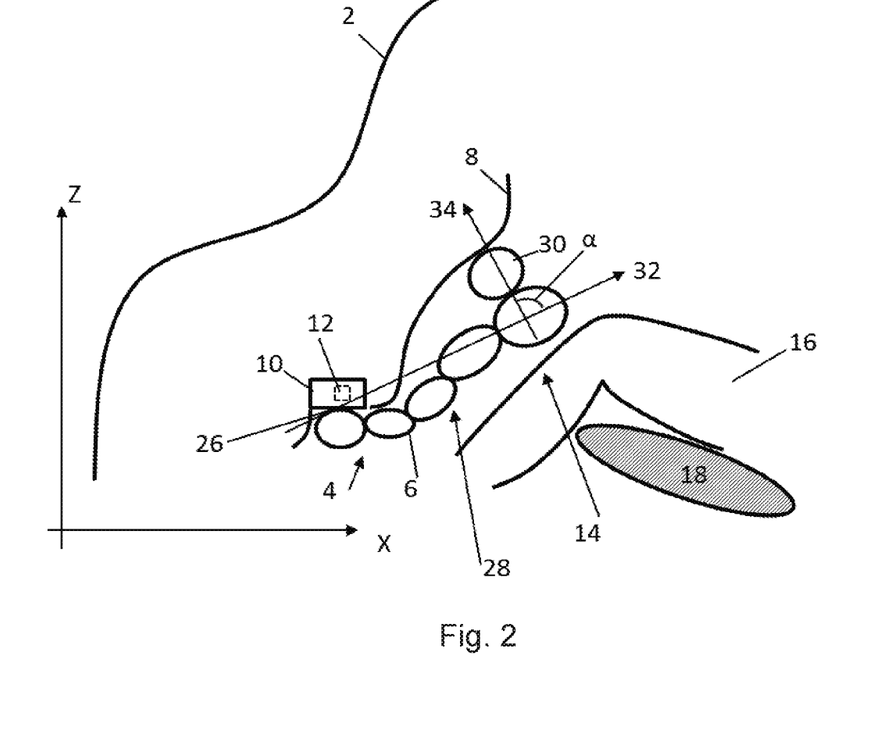
FIG. 2 illustrates the deployed knee airbag arrangement of FIG. 1b.

A deployment direction of an airbag implies a thought straight line between a centre of the inflation point, i.e. a centre of the deployment opening in the housing, hence a most proximal end, and a most distal end of the inflated airbag 6 from the inflation point, see FIG. 2.

Hence, for the airbag 6 as described above a most proximal end is located at the deployment opening 26 of the airbag housing 10, at underside of the instrument panel 8, and the most distal end from the deployment opening 26 is the top chamber 24 of the inflatable first airbag member 28 when deployed. In this way, it is envisaged that the first airbag member 28 has a deployment direction 32 extending substantially along the instrument panel 8. Thus, when used in a vehicle 2, the first airbag member 28 deploys along the instrument panel 8, whilst the second airbag member 30 may be seen as deploying towards the instrument panel 8.

A deployment direction 34 for the second airbag member 30 will be a direction of the gas flow from the first airbag member 28 into the second airbag member 30, thus through the connection between the two airbag members, which direction is substantially perpendicular to the direction of the gas flow, between the chambers of the first airbag member 28.

The second airbag member 30 may in a deployed state have a deployment direction 34 being at an angle α to the deployment direction 32 of the first airbag member 30, see FIG. 2. The angle α may be in a range from 30° to 150°, preferably from 45° to 135°, more preferably from 70° to 110°, most preferably from 80° to 100°. This gives a positive effect of increasing the depth $D_2$ of the deployed airbag 6 in the second deployment mode, as mentioned above.

Optionally, an external strap 36 may be attached between the second airbag member 30 and the first airbag member 28, depicted by a dashed line extending between the second and first airbag members 28, 30, illustrated in FIG. 1b. This has the positive effect of stabilizing and maintaining the angled position of the second airbag member 28 in relation to the first airbag member 30.

The second airbag member 28 is attached to the first airbag member 30, for example by stitching, or by being manufactured as a portion of the same fabric making up the first airbag member 30. This for instance results in that the first and second airbag member 28, 30 forms a single piece of fabric, an airbag 6, which is stored as a single unit in the airbag housing 10 when undeployed.

In FIGS. 1a and 1b, the second airbag member 30 is attached to a top end portion, i.e. the top chamber 25 of the first airbag member 28. As is illustrated in FIG. 1a, the second airbag member 30 is visible as an extra pleat of airbag fabric located between the instrument panel 8 and the top chamber 24 of the first airbag member 30. When selecting the first deployment mode, the second airbag member 30 remains undeployed.

The second airbag member 30 may also be attached at another portion of the first airbag member 28, i.e. at a different location of the first airbag member 28 than the top chamber 24 in FIGS. 1a and 1b, whilst still achieving the effect of providing a greater depth $D_2$ of the airbag 6 in the second deployment mode.

Furthermore, the second airbag member 30 is adapted to be inflated via the first airbag member 28. Thereby, the second airbag member 30 is connectable to the first airbag member 28 via a fluid communication means, such as a port, hole or opening. Thus, as illustrated in FIGS. 1a and 1b, the second airbag member 30 may be seen as constituting a selectively inflatable additional chamber, with a selectable connection to the top chamber 24 of the first airbag member 28, through which it is intended to be inflated. In the second deployment mode, the fluid communication means are activated, i.e. opened, to allow a fluid communication between the first and second airbag members 28, 30.

As implied from the above description, the second airbag member 30 has a significantly smaller volume than the first airbag member 28. Thus, the second airbag member 30 forms an extra volume which is inflated only in the second deployment mode, and in this way directs the position of the first airbag member 28 further rearwards in the vehicle 2.

The inflatable volume of the second airbag member 30 may be in a range from 5% to 40% of an inflatable volume of the first airbag member 28, preferably in a range from 10% to 25%, most preferably in a range from 10% to 20%. This implies that the second airbag 30 member may constitute a reasonably small portion of the overall volume which enables the same inflator 12 to be used in both deployment modes whilst maintaining the desired protective effect in both deployment modes.

As an alternative to the embodiment depicted in FIGS. 1a, 1b and 3, the second airbag member 30 may be adapted to in a deployed state be situated at least partly between the first airbag member 30 and the knee/shin region 14 of the vehicle occupant 16, in a corresponding manner as detailed above, although not illustrated.

Figure 3A:
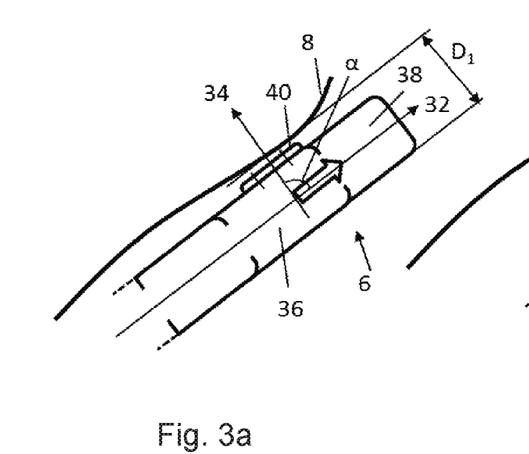
FIGS. 3a and 3b illustrate another embodiment of a knee airbag arrangement.
Figure 3B:
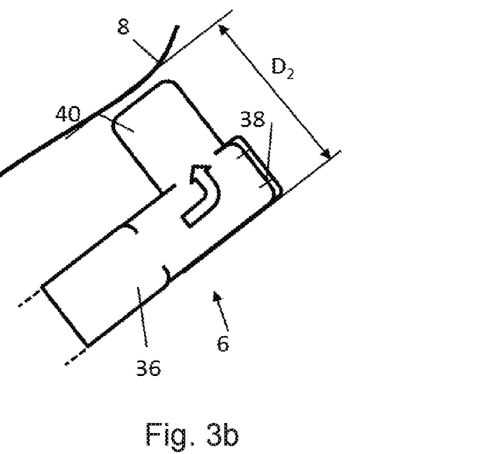

With reference to FIGS. 3a and 3b another embodiment according to the present invention will be described. The FIGS. 3a and 3b only illustrates a portion of the knee airbag arrangement in order to illustrate the embodiment. The airbag 6 comprises an inflatable common airbag member 36, a first alternative airbag member 38 being selectively inflatable, and a second alternative airbag member 40 being selectively inflatable. In the first deployment mode, the common airbag member 36 and the first alternative airbag member 38 are deployed, see FIG. 3a, as illustrated by the arrow indicating the flow of gas. In the second deployment mode, the common airbag member 36 and the second alternative airbag member 40 are deployed, see FIG. 3b. Thus, the second alternative airbag member 40 is adapted to provide the greater depth. This for instance may result in that the two deployment modes make up the same volume to be inflated, which is advantageous if using a single, common inflator for both deployment modes.

As mentioned above, it is understood that an airbag member may correspond to one or more individual chambers of the multi-chamber airbag.

In FIGS. 3a and 3b, the first and second alternative airbag members 38, 40 are attached to the common airbag member 36 such that they form a respective end portion of the deployed airbag 6, hence the most distal end to the inflation point. The first and second alternative airbag members 38, 40 form two alternative end portions, or chambers, of the airbag 6. Thus, either the first or second alternative airbag member 38, 40 is deployed, via the common airbag member 36. In other words, the common airbag member 36 is inflated prior to that the first alternative or second alternative airbag 38, 40 is inflated.

As illustrated, the first and second alternative airbag members 38, 40 in this case are attached at different positions to the common airbag member 36. The first alternative airbag member 38, being selectively deployed in the first deployment mode is attached to the common airbag member 36 such that the deployment direction is substantially aligned with the deployment direction 42 of the common airbag member 38, which would be seen as along the instrument panel, not illustrated.

The second alternative member 40, being selectively deployed in the second deployment mode, is attached to the common airbag member 36 such that the deployment direction 44 of the second airbag member 40 is at an angle to, preferably substantially perpendicularly to, the deployment direction 42 of the common airbag member 36. Thus, the second alternative airbag 40 is situated at least partly between the instrument panel 8 and the common airbag member 36, in the deployed state.

This for instance results in a corresponding configuration of the airbag 6 in the second deployment mode as previously described, in FIGS. 1a and 1b, however, with the difference of maintaining substantially the same volume to be inflated by the inflator 12 in the different deployment modes. Hence, the second alternative airbag member 40 is adapted to provide the greater depth of the airbag 6 in the second deployment mode.

The common airbag member 36 may correspond to the first airbag member 28 previously described. The second alternative airbag member 40 may correspond to the second airbag member 40 previously described.

Figure 4A:
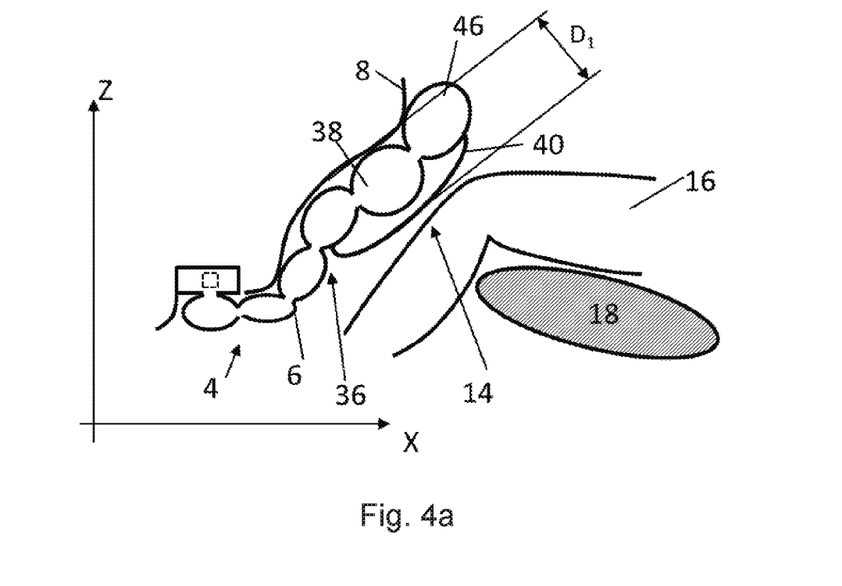
FIGS. 4a and 4b illustrate yet another embodiment of a knee airbag arrangement.
Figure 4B:
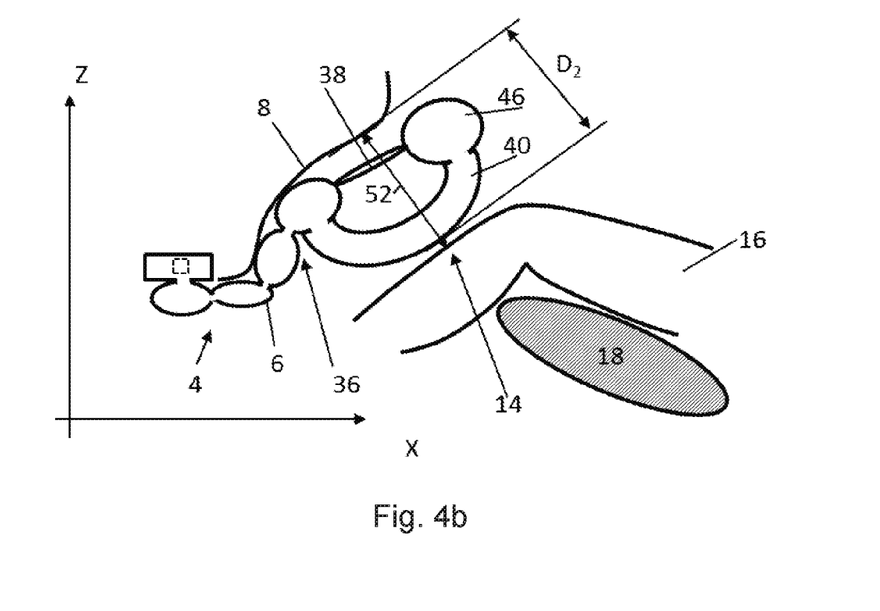

Yet another embodiment of the present invention is illustrated in FIGS. 4a and 4b. In this embodiment, the airbag 6 comprises a top airbag member 46, not comprised in the common airbag member 36. The top airbag member 46 constitutes an end portion, or chamber, of the airbag 6, most distal from the inflation point. In this case, the first and second alternative airbag members 38, 40 form a respective branch in a line of sequentially connected chambers of the common airbag member 36 and the top airbag member 46, thus forming two alternative ways for the gas to expand during deployment. The top airbag 46 is inflated via the first alternative airbag member 38 or the second alternative airbag member 40.

This is an advantageous configuration of the airbag 6 since it provides a plurality of ways of enabling a dual-mode function as recited above, providing a greater depth $D_2$ of the airbag 6 in the second deployment mode.

The different positions of the first and second alternative airbag members 38, 40 inherently given by the branching may provide the difference in depth between the deployment modes of the deployed airbag 6. The first and second alternative airbag members 38, 40 may be given different shape and/or volume providing a difference in depth of the deployed airbag 6 between the first and second deployment modes, as is illustrated in FIGS. 4a and 4b, in which the second alternative airbag 40 has a larger volume and is shaped differently, than the first alternative airbag member 38, so as to provide a greater depth of the airbag 6.

Hence, the first alternative airbag member 38 may be positioned and shaped so as to provide an airbag 6 which in the deployed state is similar to a current/existing airbag configuration providing protection to the vehicle occupant seated in a manual driving mode. As illustrated in FIG. 4a, this may render the first alternative airbag member 38 to have a shape and size similar to fit in, and match, with the chambers of the common airbag member 36 and top airbag member 46, between which two the first alternative airbag member 38 extends. The deployment direction of the first alternative airbag member 38 is in line with the deployment direction of the common airbag member 36 and the top airbag member 46, see FIG. 4a.

The second alternative airbag member 40, as illustrated in FIG. 4b, may be of different shape and/or volume than the first alternative airbag member 38, thus providing the greater depth $D_2$ of the airbag 6 in the second deployment mode. As shown in FIG. 4b, the second alternative airbag member 40 has a curved shape, i.e. a circle segment and extends between the common airbag member 36 and top airbag member 46. The curved shape of the second alternative airbag member may at least partially be due to the length of the second alternative airbag member being greater than the length of the first alternative airbag member, thus the first alternative airbag member restricts the extension of the airbag.

Further, the second alternative airbag member 40 is attached to a rear side of the common airbag member 36 and top airbag member 46, respectively, as seen along the longitudinal direction X. Hence, the second alternative airbag 40 is situated towards to knee/shin region 14 of the vehicle occupant 16. This position of the attachments of the second alternative airbag member results in a significantly different deployment direction of the second alternative airbag member as compared to the deployment direction of the common and the first alternative airbag members. The curved shape of the second alternative airbag member 40 constitutes at least a portion of an initial impact surface of the airbag 6 for the knee/shin region 14 of the vehicle occupant 16. Yet another advantage with this configuration in the second deployment mode, is that the first alternative airbag member 36, although not being deployed, provides stability to maintain the location of the deployed airbag 6 in the second deployment mode.

The second alternative airbag member may also have a curved shape such as a folded or arched shape.

A knee airbag arrangement 4 as described herein may comprise selection means for selecting the first and/or the second deployment mode, e.g. a tear seam. The selection means may be adapted for selectable inflation of the second airbag member 30, as illustrated in FIG. 1b, or selectable inflation of the first alternative airbag member 38 or second alternative airbag member 40, as illustrated in FIGS. 3a and 3b and FIGS. 4a and 4b.

The selection means may comprise or consist of a tear seam. This is advantageous since it enables an easy and simple way of selecting a selectable airbag member to be inflated.

Individual tear seams may form the connection between the first airbag member and the second airbag member, between the first alternative airbag member and the common airbag member, and between the second alternative airbag member and the common airbag member, respectively. In other words, the position of the assumed connection between a selectively inflatable airbag member and an airbag member through which it is intended to be inflated, may initially be closed and formed by the tear seam.

The tear seam may further be adapted to be opened, i.e. torn, by an activation means. By opening the tear seam, a fluid communication between the two airbag members is possible thus enabling gas to flow in a direction from the inflation point into the selected airbag member. Hence, the selective deployment of an airbag member is achieved by opening the tear seam between the selectable airbag member and the airbag member through which the selectable airbag member is intended to be inflated.

As illustrated in FIGS. 1-4, the selectively inflatable airbag member is attached to the airbag member through which the selectable airbag member is intended to be inflated, for example by stitching, or by being manufactured as a portion of the same fabric making up the airbag. Thereby, a selectively inflatable airbag member is attached to the airbag independent of whether or not it is selected to be inflated. If a selectively inflatable airbag member is not inflated it will follow the airbag during deployment as an extra ply, or pleat of airbag fabric.

The activation means for activating the selection means may comprise or consist of a pyrotechnical release, such as an exploding fastener. Thus, the tear seam may be connected to a pyrotechnical release, in a manner known to the skilled person. By way of example, the pyrotechnical release may in turn be wired to a control unit. Upon receiving an electrical signal from a control unit, indicating a selection has been made to open a tear seam, the pyrotechnical release is activated and thus opens the tear seam, and thereby a fluid communication between the airbag members is opened.

In an undeployed state of the knee airbag, the connection, i.e. the tear seam, between a selectively inflatable airbag member and the airbag member through which it is intended to be inflated, if selected, is intact, i.e. closed. Upon activation of the knee airbag arrangement, a selection of the first or second deployment mode is made, and the appropriate selection means are activated by activation means prior to, or simultaneous with, deployment of the airbag. The activation means may also be activated during deployment of the airbag.

Figure 5:
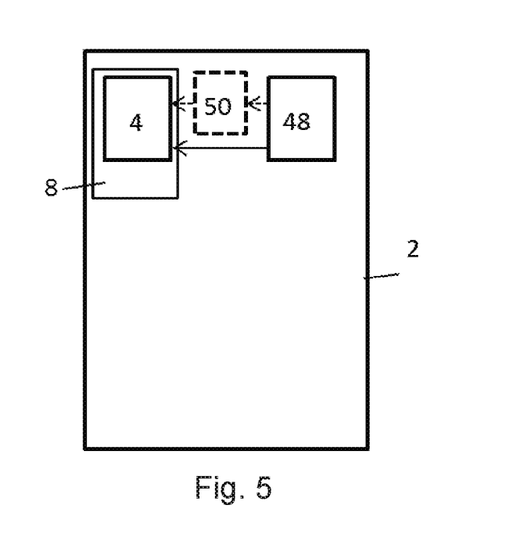
FIG. 5 schematically illustrates a vehicle comprising a knee airbag arrangement according to an embodiment of present invention.

With reference to FIG. 5, a vehicle 2 comprising an instrument panel 8 and a knee airbag arrangement 4 is schematically illustrated. The vehicle 2 further comprises at least one sensor 48 for detecting a position of a seated vehicle occupant. The output of the sensor 48 is used as a basis to control selectable deployment of the first or second deployment mode, as illustrated by the arrow in FIG. 5. This may involve selectable deployment of the second airbag member or selectable deployment of the first alternative airbag member or the second alternative airbag member, depending on the embodiment of the airbag.

By way of example, a controller 50 is adapted to receive information from the sensor 48, and is adapted to send a signal to the knee airbag arrangement 4 to actuate deployment of the airbag.

As previously described the position of the vehicle occupant may refer to if the vehicle occupant is seated in within a manual driving adjustment range, or, if the vehicle occupant is seated further to the rear than the manual driving adjustment range, as envisaged during AD. The position of the vehicle occupant may be detected using any kinds of detection means such as camera(s) and/or other types of sensors, such as radar, LIDAR and seat location sensors. It is anticipated that, independent of means chosen for detection, it is anticipated that it is the distance 52 between the instrument panel and the knee/shin region of the seated vehicle occupant that is of relevance in selecting deployment mode, see FIG. 4b. Noticeably, detecting the position of the seated vehicle occupant will directly or indirectly provide the distance 52.

Figure 6:
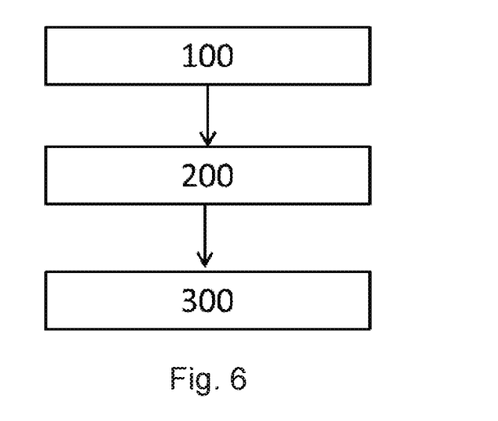
FIG. 6 illustrates a method according to the present invention.

With reference to FIG. 6 a method of deploying an airbag of a knee airbag arrangement according to the present invention will be described. The method comprises:
100: detecting a position of a seated vehicle occupant,
200: based on the detected position, selecting the first deployment mode or the second deployment mode of the airbag,
300: based on the selected deployment mode, deploying the airbag according to the first or the second deployment mode.

A method as recited above implies the positive effect of a dual-functioning knee airbag arrangement. Depending on the seated position of the vehicle occupant a first or second deployment mode is selected.

With reference to FIG. 6, step 200 of the method may comprise, in case the knee airbag arrangement comprises selection means, selecting the first deployment mode or the second deployment mode of the airbag by means of the selection means.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. A knee airbag arrangement for a vehicle, said knee airbag arrangement comprising:
an inflatable airbag, said airbag being adapted to be inflated to a position between an instrument panel of said vehicle and a knee/shin region of a vehicle occupant, wherein said airbag comprises:
an inflatable common airbag member,
a first alternative airbag member being selectively inflatable, and
a second alternative airbag member being selectively inflatable,
wherein said airbag is adapted to form a first deployment mode or a second deployment mode when in a deployed state, a depth (D2) of said airbag in said second deployment mode being greater than a depth (D1) of said airbag in said first deployment mode, a depth (D1, D2) of said airbag in a deployed state being a greatest extent of said airbag perpendicular to said instrument panel in said knee/shin region, wherein in said first deployment mode, said common airbag member and said first alternative airbag member are deployed, in said second deployment mode, said common airbag member and said second alternative airbag member are deployed, the first and second alternative airbag members having different shapes and/or volumes providing a difference in depth of the deployed knee airbag between the first and second deployment modes.

2. The knee airbag arrangement of claim 1, wherein in said second deployment mode, said depth (D2) of said airbag is at least 10 cm greater than said depth (D1) in said first deployment mode.

3. The knee airbag arrangement of claim 1,
wherein in said first deployment mode of said airbag, said first airbag member is deployed and said second airbag member is undeployed, in said second deployment mode, said first airbag member and second airbag member are deployed, such that said second airbag member provides or contributes to said depth (D2).

4. The knee airbag arrangement of claim 3, wherein said second airbag member is adapted to in a deployed state be situated at least partly between said instrument panel of said vehicle and said first airbag member.

5. The knee airbag arrangement of claim 3, wherein said second airbag member in a deployed state has a deployment direction being at an angle ($\alpha$) to a deployment direction of said first airbag member, said angle ($\alpha$) being in a range from 30° to 150°.

6. The knee airbag arrangement of claim 3, wherein said second airbag member is attached to said first airbag member.

7. The knee airbag arrangement of claim 3, wherein said second airbag member is adapted to be inflated via said first airbag member.

8. The knee airbag arrangement of claim 3, wherein an inflatable volume of said second airbag member is in a range from 5% to 40% of an inflatable volume of said airbag.

9. The knee airbag arrangement of claim 1, wherein said knee airbag arrangement comprises a selection means for selecting said first and/or said second deployment mode.

10. The knee airbag arrangement of claim 9, wherein said selection means are adapted for selectable inflation of said second airbag member, or for selectable inflation of said first alternative airbag member or said second alternative airbag member.

11. A vehicle comprising an instrument panel and a knee airbag arrangement according to claim 1 comprising an inflatable airbag, said airbag being adapted to be inflated to a position between said instrument panel of said vehicle and a knee/shin region of a vehicle occupant.

12. The vehicle of claim 11, comprising at least one sensor for detecting a position of a seated vehicle occupant indicative of a distance between said instrument panel of said vehicle and said knee/shin region of said vehicle occupant, the output of said sensor being used as a basis to select said first or second deployment mode.

13. A method for deploying an airbag of a knee airbag arrangement according to claim 1, said method comprising:
   (a) detecting a position of a seated vehicle occupant indicative of a distance between said instrument panel of said vehicle and said knee/shin region of said vehicle occupant,
   (b) based on said detected position, selecting said first deployment mode or said second deployment mode of said airbag, and
   (c) based on said selection, deploying said airbag according to said first or second deployment mode.

14. The method of claim 13, wherein step (b) comprises:
selecting said first deployment mode or said second deployment mode by means of a selection means.

* * * * *